US009635407B2

(12) United States Patent
Li et al.

(10) Patent No.: US 9,635,407 B2
(45) Date of Patent: Apr. 25, 2017

(54) METHOD AND APPARATUS FOR BOTTLENECK COORDINATION TO ACHIEVE QOE MULTIPLEXING GAINS

(71) Applicant: Samsung Electronics Co., Ltd., Suwon-si, Gyeonggi-do (KR)

(72) Inventors: Zhu Li, Plano, TX (US); Imed Bouazizi, Plano, TX (US); Youngkwon Lim, Allen, TX (US); Kyungmo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/883,465

(22) Filed: Oct. 14, 2015

(65) Prior Publication Data

US 2016/0127753 A1     May 5, 2016

Related U.S. Application Data

(60) Provisional application No. 62/064,791, filed on Oct. 16, 2014.

(51) Int. Cl.
| | |
|---|---|
| *H04N 21/2662* | (2011.01) |
| *H04N 21/845* | (2011.01) |
| *H04N 21/61* | (2011.01) |
| *H04N 21/4363* | (2011.01) |
| *H04L 29/08* | (2006.01) |
| *H04N 21/2381* | (2011.01) |
| *H04N 21/414* | (2011.01) |
| *H04L 27/00* | (2006.01) |
| *H04N 21/462* | (2011.01) |

(52) U.S. Cl.
CPC ..... *H04N 21/2662* (2013.01); *H04L 27/0002* (2013.01); *H04L 29/08954* (2013.01); *H04N 21/2381* (2013.01); *H04N 21/41407* (2013.01); *H04N 21/43637* (2013.01); *H04N 21/4621* (2013.01); *H04N 21/6131* (2013.01); *H04N 21/8456* (2013.01)

(58) Field of Classification Search
USPC ............... 725/62, 116; 370/465; 375/240.02, 375/240.12; 709/235
See application file for complete search history.

(56) References Cited

U.S. PATENT DOCUMENTS

| | | |
|---|---|---|
| 2013/0031211 A1 | 1/2013 | Johnson et al. |
| 2013/0124746 A1 | 5/2013 | Arya et al. |
| | (Continued) | |

FOREIGN PATENT DOCUMENTS

WO    WO 2013/187667      12/2013

OTHER PUBLICATIONS

International Search Report and Written Opinion issued for PCT/KR2015/010932 dated Feb. 11, 2016, 9 pgs.

*Primary Examiner* — Hoang-Vu A Nguyen-Ba (57) ABSTRACT

An access point that provides video streaming performs a bottleneck QoE maximization solution utilizing the latest media transport technology developed by MPEG known as MPEG Media Transport (MMT). The access point includes a transceiver configured to transmit one or more video sequences. The access point also includes one or more processors configured to perform bottleneck coordination by utilizing MMT to transmit, via the transceiver, the one or more video sequences.

20 Claims, 6 Drawing Sheets

(56) References Cited

U.S. PATENT DOCUMENTS

| | | | |
|---|---|---|---|
| 2014/0036999 A1* | 2/2014 | Ryu | H04N 19/50 375/240.12 |
| 2014/0143823 A1 | 5/2014 | Manchester et al. | |
| 2014/0161050 A1 | 6/2014 | Grinshpun et al. | |
| 2014/0307734 A1* | 10/2014 | Luby | H04L 12/18 370/390 |
| 2015/0095727 A1* | 4/2015 | Cho | H04L 1/0002 714/708 |
| 2015/0100996 A1* | 4/2015 | Freeman | H04N 21/4385 725/110 |
| 2016/0056927 A1* | 2/2016 | Liu | H04W 28/04 370/216 |
| 2016/0078901 A1* | 3/2016 | Toma | H04N 21/643 386/355 |
| 2016/0100220 A1* | 4/2016 | Toma | H04H 60/13 725/110 |
| 2016/0142757 A1* | 5/2016 | Toma | H04N 21/26283 725/116 |
| 2016/0165276 A1* | 6/2016 | Toma | H04H 20/93 725/116 |
| 2016/0192027 A1* | 6/2016 | Toma | H04N 21/6379 725/118 |

* cited by examiner

METHOD AND APPARATUS FOR BOTTLENECK COORDINATION TO ACHIEVE QOE MULTIPLEXING GAINS

CROSS-REFERENCE TO RELATED APPLICATION(S) AND CLAIM OF PRIORITY

The present application claims priority to U.S. Provisional Patent Application Ser. No. 62/064,791, filed Oct. 16, 2014, entitled "METHOD AND APPARATUS FOR BOTTLENECK COORDINATION TO ACHIEVE QoE MULTIPLEXING GAINS". The content of the above-identified patent document is incorporated herein by reference.

TECHNICAL FIELD

The present application relates generally to MPEG Media Transport and, more specifically, to a system and method for reducing bottleneck coordination in a MPEG Media Transport system.

BACKGROUND

Advances in the Third Generation (3G)/Fourth Generation (4G) mobile communication technology and explosive growth of mobile devices, are fueling an unprecedented rapid growth of video traffic over the mobile networks. The wireless capacity is lagging far behind this rapid growth and how to deal with it is the main issue for the mobile network operators. According to some marketing studies, the mobile video growth rate will be 90% per year from 2013 through 2017, this is far out-pacing the growth of the mobile network capacity.

In addition to improve the video coding and wireless spectrum efficiency, more efficiency can be extracted from the optimization of the multimedia transport and mobile network operation optimization. Moving Picture Experts Group (MPEG) developed an adaptive streaming of video over Hyper-Text Transport Protocol (HTTP) referred to as Dynamic Adaptive Streaming over HTTP (DASH). DASH allows for adaptation of variable bit rate streaming of video over a throughput varying channel. This is well suited for the mobile video application, where instead of streaming at constant rate that may cause a freeze in playback when network bandwidth is low, DASH allows for switching to a lower rate to avoid freezes and continuing the streaming with a lower quality version.

SUMMARY

In a first embodiment, an apparatus is provided. The apparatus includes a transceiver configured to transmit one or more video sequences. The apparatus also includes one or more processors configured to perform bottleneck coordination by utilizing MPEG Media Transport (MMT) to transmit, via the transceiver, the one or more video sequences.

In a second embodiment, a non-transitory computer readable medium is provided. The non-transitory computer readable medium includes a plurality of instructions. The plurality of instructions are configured to, when executed by a processor, cause the processor to transmit one or more video sequences. The plurality of instructions also are configured to, when executed by the processor, cause the processor to perform bottleneck coordination by utilizing MPEG Media Transport (MMT) to transmit, via the transceiver, the one or more video sequences.

In a third embodiment, a method is provided. The method includes transmitting one or more video sequences. The method also includes performing bottleneck coordination by utilizing MPEG Media Transport (MMT) to transmit, via the transceiver, the one or more video sequences.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

DASH allows for adaptation of variable bit rate streaming of video over a throughput varying channel. How to best adapt the DASH rate to the network constraints and achieving the best Quality of Experience (QoE) possible has been well studied within a single session. To deal with bottlenecks where multiple video sessions are sharing the link, DASH is lacking the information and mechanisms.

DASH is a client driven, pull based streaming solution, which lacks the information of bottleneck resource constraints, as well as rate-distortion trade-off info of video sessions that are sharing the bottleneck. Being a client driven, pull-based streaming solution, DASH cannot effectively coordinate the traffic over the bottleneck and achieving QoE maximization for all video sessions sharing the bottleneck. Furthermore, the HTTP transport is not well suited for wireless channels, as the HTTP transport interprets packet loss as congestion, and halves the transmitting window, which results in costly slow start and loss of utilization of the channel. These two issues prevent DASH from achieving the full QoE potentials of the mobile video applications over the current generation of 3G/4G wireless networks.

Certain embodiments of the present disclosure address the aforementioned problems by developing a bottleneck QoE maximization solution utilizing the latest media transport technology developed by MPEG known as MPEG Media Transport (MMT), which is a push based solution over IP networks well suited for mobile network bottleneck coordination. MMT is designed to be a versatile next generation multimedia transport solution by the MPEG standardization body, with new features and functions developed from the last ten years of research within the multimedia communication community. MMT has a rich set of QoS management tools, to solve the problem of maximizing QoE for multiple video sessions over the wireless bottleneck. The problem is formulated as a resource constrained optimization problem, and an operationally optimal scheduling solution is developed based on the QoE information carried in the ISO Based Media File Format (ISOBMFF), and multiple QoS operating point support in MMT. Simulation results demonstrated very good results of this solution and attracted strong interests from the network group. Demo clips are also available for subjective evaluation. Certain embodiments of the present disclosure utilize the asset delivery characteristics (ADC) scheme in the MPEG MMT, to signal the rate-distortion tradeoffs of video sessions sharing a common bottleneck, and achieve graceful quality degradations among traffics, while meeting the bottleneck throughput constraint. Certain embodiments of the present disclosure perform rate-distortion signaling of the traffics sharing the bottleneck. Certain embodiments of the present disclosure perform optimization of the traffic thinning schemes at the bottleneck coordinator. Certain embodiments of the present disclosure perform graceful degradation over multiple rate reduction operating points. Certain embodiments of the present disclosure provide better end user QoE. In addition, certain embodiments of the present disclosure provide more elasticity to the video traffic and give more flexibility to the network operators.

The following documents and standards descriptions are hereby incorporated into the present disclosure: Cisco Visual Networking Index: Forecast and Methodology, 2012-2017, (REF1); A. E. Essaili, D. Schroeder, D. Staehle, M. Shehada, W. Kellerer, Eckehard G. Steinbach: Quality-of-experience driven adaptive HTTP media delivery. ICC 2013: 2480-2485, (REF2); J. Huang, Z. Li, M. Chiang, A. K. Katsaggelos: Joint Source Adaptation and Resource Allocation for Multi-User Wireless Video Streaming. IEEE Trans. Circuits Syst. Video Techn. 18(5): 582-595 (2008) (REF3); Kuhn, H. W.; Tucker, A. W. (1951). "Nonlinear programming" Proceedings of 2nd Berkeley Symposium. Berkeley: University of California Press. pp. 481-492. (REF4); Z. Li, J. Huang, A. K. Katsaggelos: Pricing Based Collaborative Multi-User Video Streamming Over Power Constrained Wireless Downlink. IEEE ICASSP (5) 2006: 381-384, (REF5); Y. Li, Z. Li, M. Chiang, A. R. Calderbank, "Content-Aware Distortion-Fair Video Streaming in Congested Networks", IEEE Transactions on Multimedia 11(6): 1182-1193 (2009), (REF6); Z. Li, and I. Bouazizi, "Light Weight Content Fingerprinting for Video Playback Verification in MPEG DASH", Proceedings of IEEE PacketVideo, San Jose, 2013, (REF7); Z. Li and I. Bouazizi, "MMT Amd1: Multiple QoE Operating Points Signalling in MMT ADC", ISO/IEC/JTC1/MPEG2014/m33237, (REF8); Z. Li, and I. Bouazizi, "FF: Temporal Quality Signalling in ISO Based Media File Format", ISO/IEC/JTC1/MPEG2014/m33239, (REF9); C. Liu, I. Bouazizi, M. Gabbouj, "Rate Adaptation for Adaptive HTTP Streaming", ACM Multimedia Systems 2011, San Jose, Calif., USA, February 2011, (REF10); ISO/IEC 23008-1, Text of ISO/IEC 2nd CD 23008-1 MPEG Media Transport, (REF11); Jens-Rainer Ohm, Gary J. Sullivan: High Efficiency Video Coding: The Next Frontier in Video Compression [Standards in a Nutshell]. IEEE Signal Process. Mag. 30(1): 152-158 (2013), (REF12); I. Sodagar: "The MPEG-DASH Standard for Multimedia Streaming Over the Internet", IEEE MultiMedia 18(4): 62-67 (2011), (REF13); Y. Wang, S. Wenger, J. Wen, and A. Katsaggelos, "Error Resilient Video Coding Techniques for Real Time Video Communication", IEEE Signal Processing Magazine, vol. 14(7), 2000, (REF14); and Thomas Wiegand, Gary J. Sullivan, Gisle Bjntegaard, Ajay Luthra: Overview of the H.264/AVC video coding standard. IEEE Trans. Circuits Syst. Video Techn. 13(7): 560-576 (2003), (REF15). The contents of each of the aforementioned references are hereby incorporated by reference in their entirety.

Figure 1:
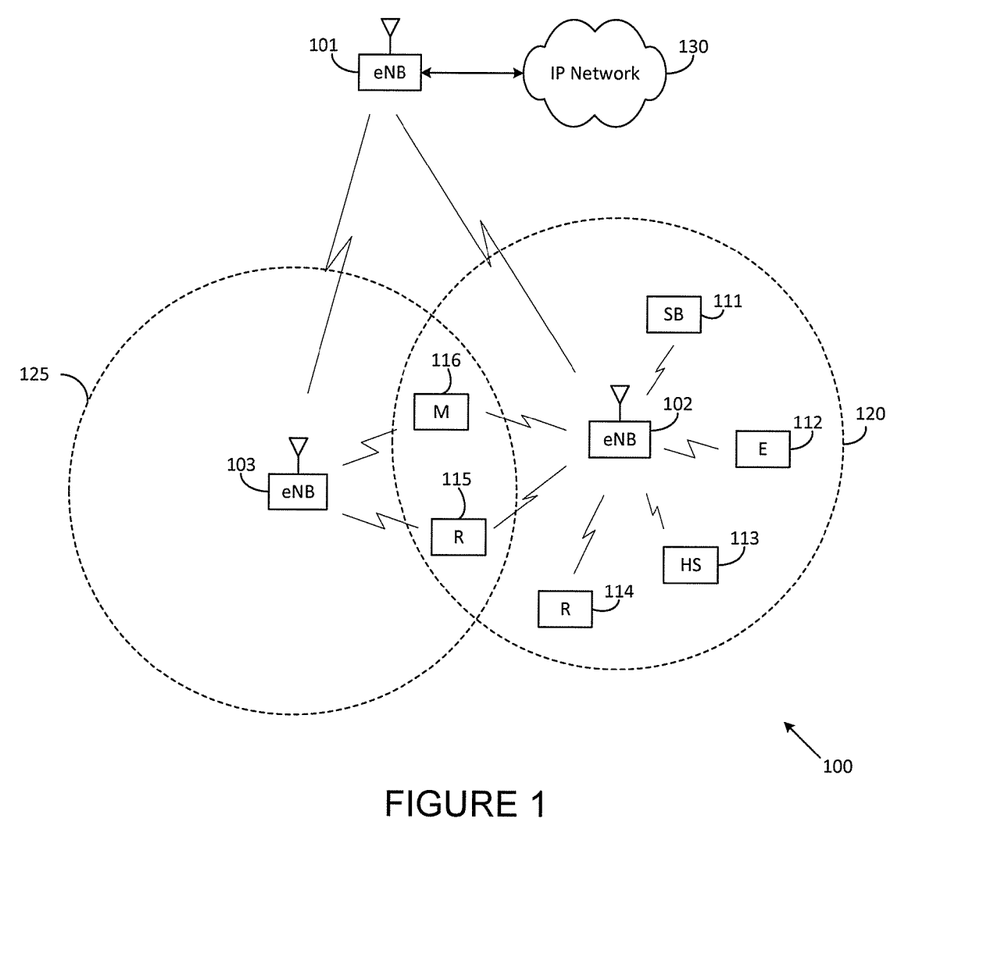
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point" (AP). For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of eNB's 101-103 are configured to support or utilize an asset delivery characteristics (ADC) scheme in the MPEG MMT, to signal the rate-distortion tradeoffs of video sessions sharing a common bottleneck, and achieve graceful quality degradations among traffics, while meeting the bottleneck throughput constraint. In addition, one or more of UE's 111-116 are configured to support, receive or utilize the asset delivery characteristics (ADC) scheme in the MPEG MMT, to signal the rate-distortion tradeoffs of video sessions sharing a common bottleneck, and achieve graceful quality degradations among traffics, while meeting the bottleneck throughput constraint.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
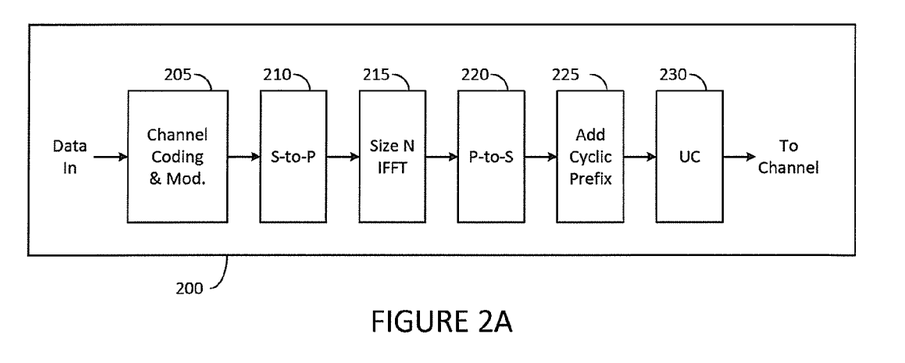
FIGS. 2A and 2B illustrate example wireless transmit and receive paths according to this disclosure.
Figure 2B:
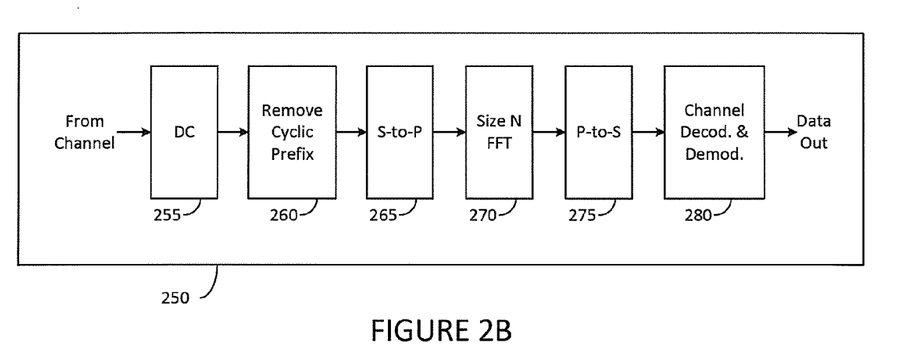

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to utilize an asset delivery characteristics (ADC) scheme in the MPEG MMT, to signal the rate-distortion tradeoffs of video sessions sharing a common bottleneck, and achieve graceful quality degradations among traffics, while meeting the bottleneck throughput constraint.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
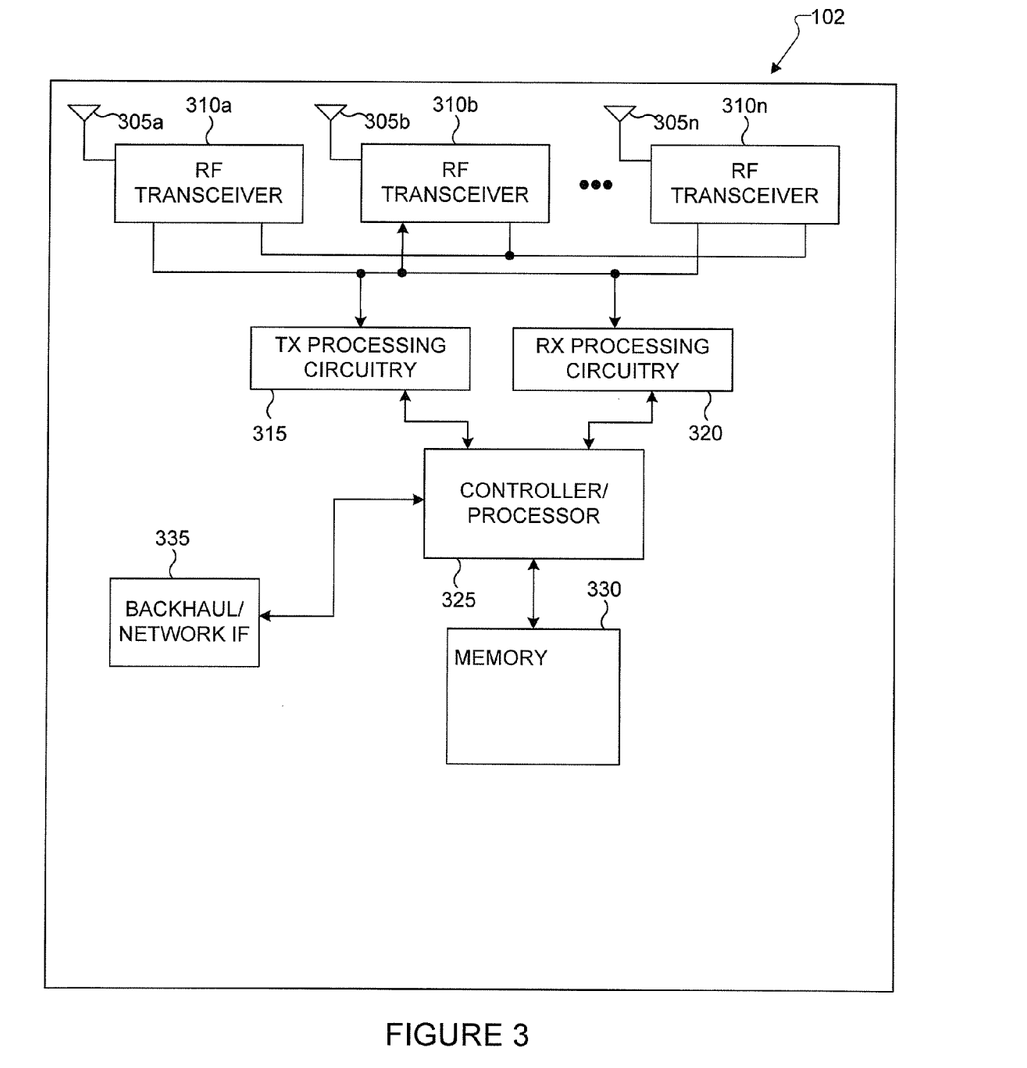
FIG. 3 illustrates an example eNB 102 according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support or utilize an asset delivery characteristics (ADC) scheme in the MPEG MMT, to signal the rate-distortion tradeoffs of video sessions sharing a common bottleneck, and achieve graceful quality degradations among traffics, while meeting the bottleneck throughput constraint. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support communication with aggregation of FDD cells and TDD cells.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

Figure 4:
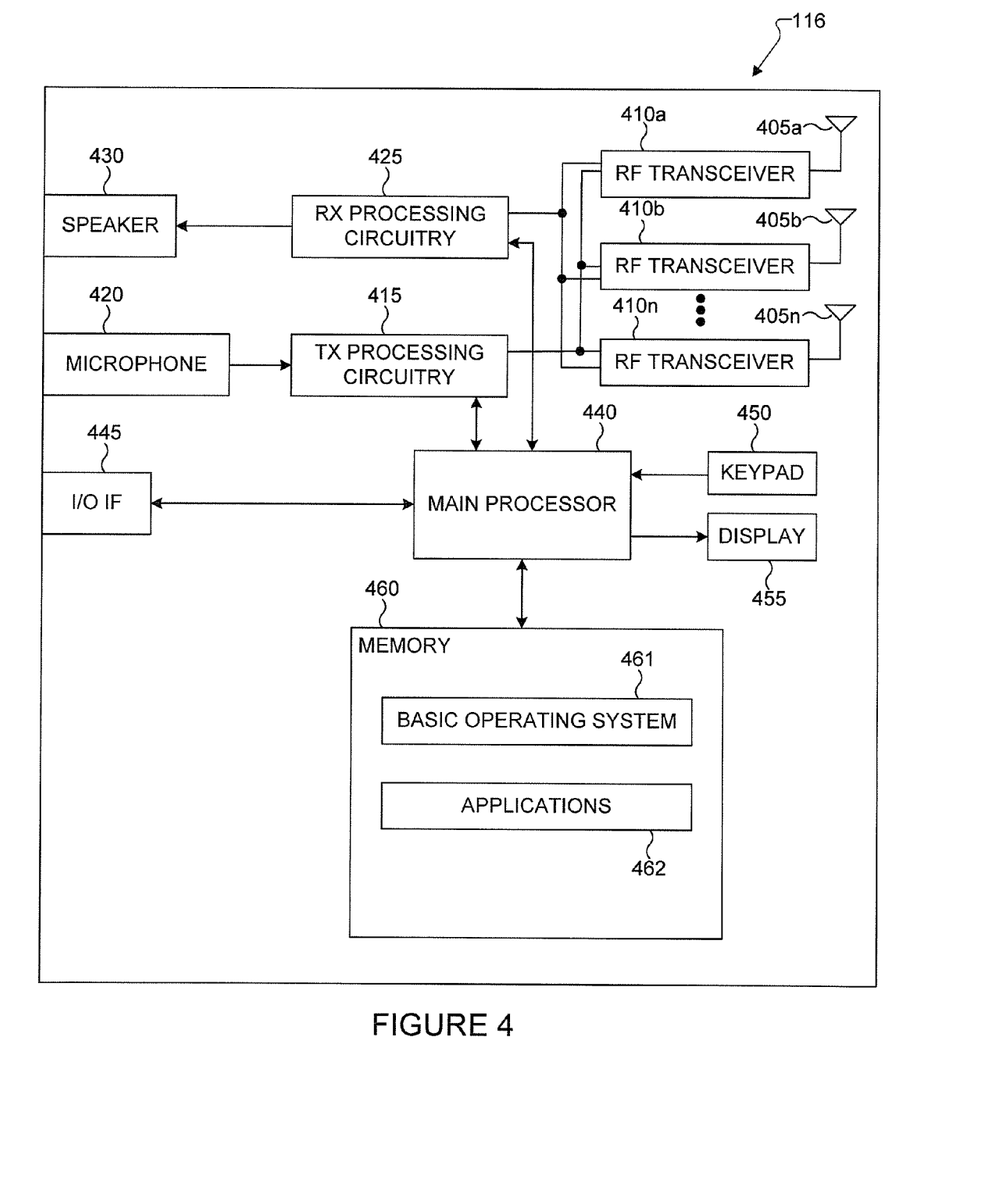
FIG. 4 illustrates an example UE 116 according to this disclosure.

FIG. 4 illustrates an example UE 116 according to this disclosure. The embodiment of the UE 116 illustrated in FIG. 4 is for illustration only, and the UEs 111-115 of FIG. 1A could have the same or similar configuration. However, UEs come in a wide variety of configurations, and FIG. 4 does not limit the scope of this disclosure to any particular implementation of a UE.

The UE 116 includes multiple antennas 405a-405n, radio frequency (RF) transceivers 410a-410n, transmit (TX) processing circuitry 415, a microphone 420, and receive (RX) processing circuitry 425. The TX processing circuitry 415 and RX processing circuitry 425 are respectively coupled to each of the RF transceivers 410a-410n, for example, coupled to RF transceiver 410a, RF transceiver 410b through to a $N^{th}$ RF transceiver 410n, which are coupled respectively to antenna 405a, antenna 405b and an N$^{th}$ antenna 405n. In certain embodiments, the UE 116 includes a single antenna 405a and a single RF transceiver 410a. The UE 116 also includes a speaker 430, a main processor 440, an input/output (I/O) interface (IF) 445, a keypad 450, a display 455, and a memory 460. The memory 460 includes a basic operating system (OS) program 461 and one or more applications 462.

The RF transceivers 410a-410n receive, from respective antennas 405a-405n, an incoming RF signal transmitted by an eNB or AP of the network 100. In certain embodiments, each of the RF transceivers 410a-410n and respective antennas 405a-405n is configured for a particular frequency band or technological type. For example, a first RF transceiver 410a and antenna 405a can be configured to communicate via a near-field communication, such as BLUETOOTH®, while a second RF transceiver 410b and antenna 405b can be configured to communicate via a IEEE 802.11 communication, such as Wi-Fi, and another RF transceiver 410n and antenna 405n can be configured to communicate via cellular communication, such as 3G, 4G, 5G, LTE, LTE-A, or WiMAX. In certain embodiments, one or more of the RF transceivers 410a-410n and respective antennas 405a-405n is configured for a particular frequency band or same technological type. The RF transceivers 410a-410n down-converts the incoming RF signal to generate an intermediate frequency (IF) or baseband signal. The IF or baseband signal is sent to the RX processing circuitry 425, which generates a processed baseband signal by filtering, decoding, and/or digitizing the baseband or IF signal. The RX processing circuitry 425 transmits the processed baseband signal to the speaker 430 (such as for voice data) or to the main processor 440 for further processing (such as for web browsing data).

The TX processing circuitry 415 receives analog or digital voice data from the microphone 420 or other outgoing baseband data (such as web data, e-mail, or interactive video game data) from the main processor 440. The TX processing circuitry 415 encodes, multiplexes, and/or digitizes the outgoing baseband data to generate a processed baseband or IF signal. The RF transceivers 410a-410n receive the outgoing processed baseband or IF signal from the TX processing circuitry 415 and up-converts the baseband or IF signal to an RF signal that is transmitted via one or more of the antennas 405a-405n.

The main processor 440 can include one or more processors or other processing devices and execute the basic OS program 461 stored in the memory 460 in order to control the overall operation of the UE 116. For example, the main processor 440 could control the reception of forward channel signals and the transmission of reverse channel signals by the RF transceivers 410a-410n, the RX processing circuitry 425, and the TX processing circuitry 415 in accordance with well-known principles. In some embodiments, the main processor 440 includes at least one microprocessor or microcontroller.

The main processor 440 is also capable of executing other processes and programs resident in the memory 460, such as operations to support or utilize an asset delivery characteristics (ADC) scheme in the MPEG MMT, to signal the rate-distortion tradeoffs of video sessions sharing a common bottleneck, and achieve graceful quality degradations among traffics, while meeting the bottleneck throughput constraint. The main processor 440 can move data into or out of the memory 460 as required by an executing process. In some embodiments, the main processor 440 is configured to execute the applications 462 based on the OS program 461 or in response to signals received from eNBs or an operator.

The main processor 440 is also coupled to the I/O interface 445, which provides the UE 116 with the ability to connect to other devices such as laptop computers and handheld computers. The I/O interface 445 is the communication path between these accessories and the main controller 440.

The main processor 440 is also coupled to the keypad 450 and the display unit 455. The user of the UE 116 can use the keypad 450 to enter data into the UE 116. The display 455 can be a liquid crystal display or other display capable of rendering text or at least limited graphics, such as from web sites, or a combination thereof.

The memory 460 is coupled to the main processor 440. Part of the memory 460 could include a random access memory (RAM), and another part of the memory 460 could include a Flash memory or other read-only memory (ROM).

Although FIG. 4 illustrates one example of UE 116, various changes may be made to FIG. 4. For example, various components in FIG. 4 could be combined, further subdivided, or omitted and additional components could be added according to particular needs. As a particular example, the main processor 440 could be divided into multiple processors, such as one or more central processing units (CPUs) and one or more graphics processing units (GPUs). Also, while FIG. 4 illustrates the UE 116 configured as a mobile telephone or smartphone, UEs could be configured to operate as other types of mobile or stationary devices.

Figure 5:
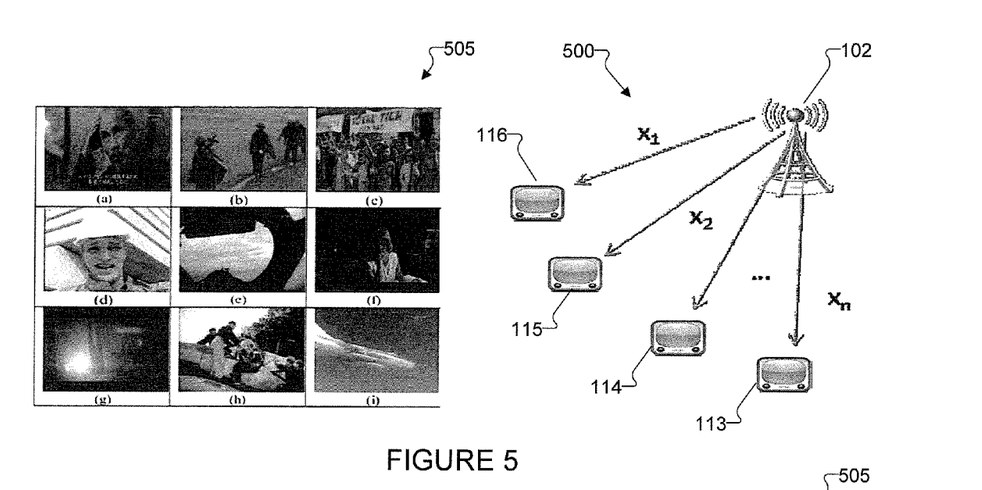
FIG. 5 illustrates a bottleneck QoE multiplexing gain problem according to this disclosure.

FIG. 5 illustrates a bottleneck QoE multiplexing gain problem according to this disclosure. The embodiment of the bottleneck 500 QoE multiplexing gain problem shown in FIG. 5 is for illustration only. Other embodiments could be used without departing from the scope of the present disclosure.

When multiple video sessions, having respective video sequences 505a-i, are sharing a congested link, the situation is called bottleneck 500. Dealing with bottleneck is the central theme of the multimedia transport, as when network is not congested, all traffic QoS requests can be fulfilled; then there is no need for traffic engineering. The problem is illustrated in the FIG. 5, multiple video traffics $X_1, X_2 \ldots X_N$ are sharing a capacity constrained link, $\Sigma_k x_k \leq C$, which is smaller than the total throughput required by the traffic, $\Sigma_k r_k > C$. How to adapt each individual video stream, to meet this capacity constraint, while achieving the best QoE possible for all users, is the objective. This problem is referred to as a QoE multiplexing gain problem.

Figure 6:
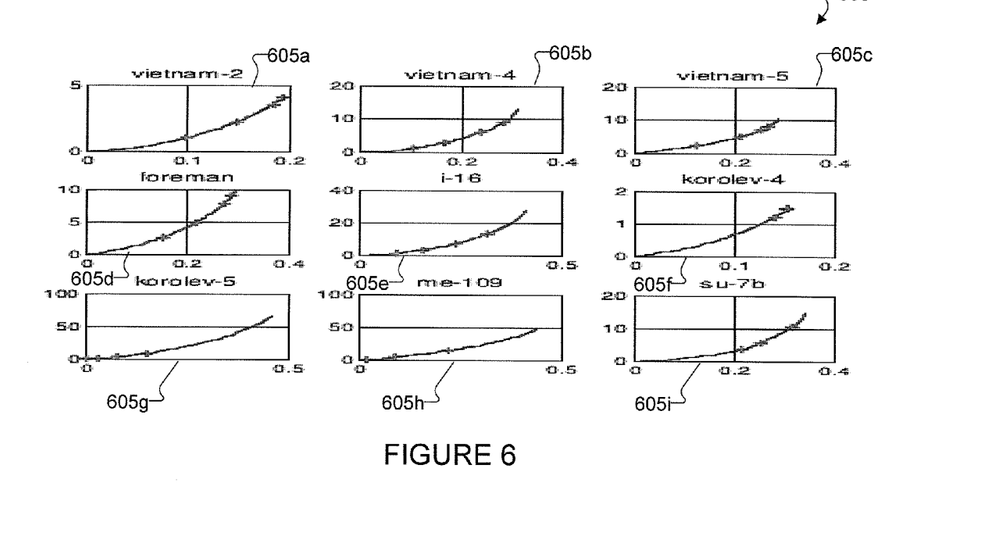
FIG. 6 illustrates temporal distortion from frame drops and rate reduction plots according to this disclosure.

FIG. 6 illustrates temporal distortion from frame drops and rate reduction plots according to this disclosure. The embodiments of the temporal distortion 600 show in FIG. 6 are for illustration only. Other embodiments could be used without departing from the scope of the present disclosure.

To coordinate the transmission of video streams sharing the bottleneck link, a new MMT function, Bottleneck Traffic Orchestrator (BTO), is introduced. For example, the eNB 102 can include processing circuitry configured to perform the BTO process or the eNB 102 can include a dedicated BTO processor or controller configured to perform the BTO process. The BTO reads the ADC information of each video bit-stream at the bottleneck, constructs a rate reduction-distortion incurred table, and computes the pruning index for each video session. This is supported by the multiple operating point ADC supported in MMT. Examples of the Rate reduction-Distortion (RD) table 605 computed for the four-second segments from the 9 video sequences 505a-i, illustrated in FIG. 5 are shown in FIG. 6. For example, a first video sequence 505a corresponds with a first table 605a; a second video sequence 505b corresponds with a second table 605b; a third video sequence 505c corresponds with a third table 605c; a fourth video sequence 505d corresponds with a fourth table 605d; a fifth video sequence 505e corresponds with a fifth table 605e; a sixth video sequence 505f corresponds with a sixth table 605f; a seventh video sequence 505g corresponds with a seventh table 605g; an eighth video sequence 505h corresponds with an eighth table 605h; and a ninth video sequence 505i corresponds with a ninth table 605i.

The syntax of signaling the rate-distortion trade-offs is specified in the MMT ADC. TABLE 1 illustrates an example ADC message syntax:

TABLE 1

ADC message syntax

| Syntax | Value | No. of bits | Mnemonic |
|---|---|---|---|
| ADC_message ( ) { | | | |
|   message_id | | 16 | uimsbf |
|   version | | 8 | uimsbf |
|   length | | 32 | uimsbf |
|   message_payload { | | | |
|     validity_start_time | | 32 | uimsbf |
|     validity_duration | | 32 | uimsbf |
|     ADC_level_flag | | 1 | boolean |
|     flow_label_ flag | | 1 | boolean |
|     reserved | | 6 | uimsbf |
|     if (ADC_level_flag == 1) { | | | |
|       MPU_sequence_number | | 32 | uimsbf |
|     } | | | |
|     packet_id | | 16 | uimsbf |
|     qos_descriptor{ | | | uimsbf |
|       loss_tolerance | | 8 | bslbf |
|       jitter_sensitivity | | 8 | bslbf |
|       class_of_service | | 1 | boolean |
|       bidirection_indicator | | 1 | boolean |
|       reserved | | 6 | bslbf |
|     } | | | |
|     qoe_descriptor { | | | |
|       n_samples | | 16 | uimsbf |
|       for (i=0;i<N1; i++) { | | | |
|         sample_group_index | | 16 | uimsbf |
|       } | | | |
|       spatial_quality | | 16 | uimsbf |
|       temporal_quality | | 16 | uimsbf |
|       aggregate_rate | | 32 | uimsbf |
|     } | | | |
|     if (class_of _service == 1) | | | |
|     bitstream_descriptor_vbr{ | | | |
|       sustainable_rate | | 16 | uimsbf |
|       buffer_size | | 16 | uimsbf |
|       peak_rate | | 16 | uimsbf |
|       max_MFU_size | | 8 | uimsbf |
|       mfu_period | | 8 | uimsbf |
|     }else | | | |
|     bitstream_descriptor_cbr{ | | | |
|       peak_rate | | 16 | uimsbf |
|       max_MFU_size | | 8 | uimsbf |
|       mfu_period | | 8 | uimsbf |
|     } | | | |
|     If(flow_label_flag == 1) { | | | |
|       flow_label | | 7 | uimsbf |
|       reserved | | 1 | uimsbf |
|     } | | | |
|   } | | | |
| } | | | |

There are a number of strategies the BTO can apply to achieve QoE multiplexing gains at the bottleneck. The BTO can minimize the average distortion from pruning streams, such as by using Equation 1:

$$\min_{x_1, x_2, \ldots, x_n} \Sigma_k D_k(x_k), s.t., \Sigma_k R_k(x_k) \leq C \quad (1)$$

In Equation 1, $x_k$ is the ADC operating point available for stream k, which is associated with a resulting frame loss induced distortion $D_k(x_k)$, and aggregated reduced bit rate of $R_k(x_k)$. The rate and distortion function for each stream, $\{D_k( ), R_k( )\}$ are carried in the ADC of each stream. The optimal solution to Equation 1 can be easily found by a search on the ADCs of the bottlenecked streams.

Figure 7:
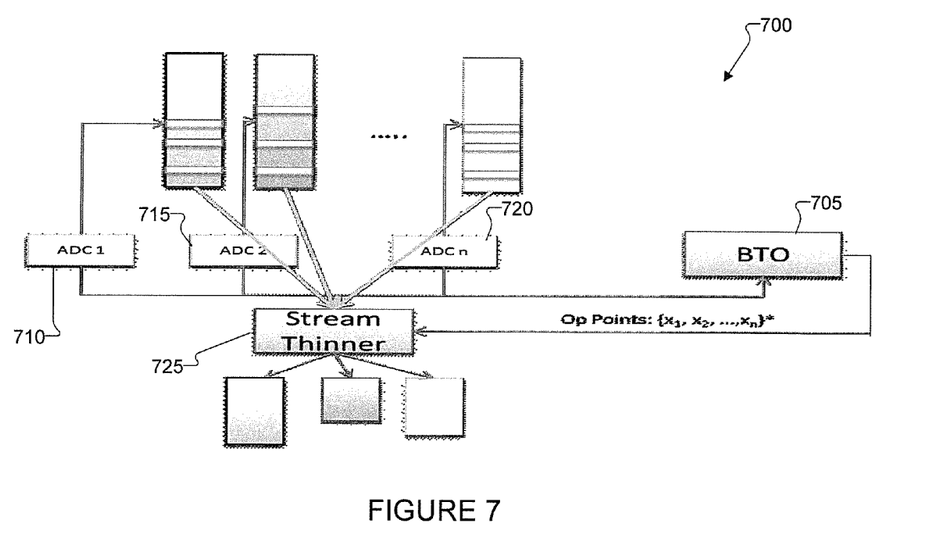
FIG. 7 illustrates Bottleneck Coordination Operations according to this disclosure.

FIG. 7 illustrates Bottleneck Coordination Operations according to embodiments of the present disclosure. The embodiment of the Bottleneck Coordination Operations 700 shown in FIG. 7 is for illustration only. Other embodiments could be used without departing from the scope of the present disclosure.

In the example shown in FIG. 7, the BTO 705 communicates with multiple ADC's, namely $ADC_1$ 710, $ADC_2$ 715 through $ADC_n$ 720. The BTO 705 also communicates with a stream thinner 725. In certain embodiments, one or more of the ADCs 710-720 or stream thinner 725 is implemented by processing circuitry configured to perform the respective processes or one or more dedicated ADC or stream thinner processors or controllers are configured to perform the respective processes.

Upon computing optimal operating points $\{x_1^*, x_2^*, \ldots, x_n^*\}$, the BTO 705 transmits the optimal operating points $\{x_1^*, x_2^*, \ldots, x_n^*\}$ to the stream thinner 725, that is the bottleneck coordinator. In the stream thinner 725, the streams that are buffered are pruned to avoid congestion.

A bottleneck link with nine youtube sequences 505a-i as shown in FIG. 5 are set up. A BTO algorithm is applied, and the resulting bottleneck pruned video streams for capacity deficits of 10%, 15%, 20%, and 25%, are available for evaluation at the following example URLs, as well as the original un-pruned sequences.

| seq | URL |
|---|---|
| Original | ...youtu.be/FuvIb5vudnc |
| x = 10% | ...youtu.be/FuvIb5vudnc |
| x = 15% | ...youtu.be/FuvIb5vudnc |
| x = 20% | ...youtu.be/FuvIb5vudnc |
| x = 25% | ...youtu.be/FuvIb5vudnc |

The aforementioned example demonstrates the capability of graceful QoE degradation when the bottleneck deficit increases, and the "busy" sequences are helped by the "easy" sequences.

Embodiments of this disclosure provide a bottleneck coordination solution based on ISOBMFF QoE metrics and MMT ADCs. Example simulation results demonstrate the effectiveness of such coordination scheme.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. §112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus comprising:
a transceiver configured to transmit one or more video sequences; and
one or more processors configured to:
utilize asset delivery characteristics (ADC) scheme in a MPEG Media Transport (MMT) to signal rate-distortion tradeoffs of video sessions sharing a common bottleneck;
construct a rate reduction-distortion incurred table;
compute a pruning index for each of the video sessions; and
perform bottleneck coordination by utilizing the MMT to transmit, via the transceiver, the one or more video sequences.

2. The apparatus as set forth in claim 1, wherein the one or more video sessions comprise one or more video streams including the one or more video sequences.

3. The apparatus as set forth in claim 1, further comprising a bottleneck coordinator configured to communicate with one or more ADC' s to perform traffic thinning.

4. The apparatus as set forth in claim 3, wherein the bottleneck coordinator is configured to prune the one or more videos for at least one of: a determined capacity deficit; and a number of capacity deficits.

5. The apparatus as set forth in claim 3, wherein the one or more processors is configured to perform optimization of traffic thinning schemes at the bottleneck coordinator.

6. The apparatus as set forth in claim 3, wherein the one or more processors is configured to compute optimal operating points $\{x_1^*, x_2^*, \ldots, x_n^*\}$, and communicate the optimal operating points $\{x_1^*, x_2^*, \ldots, x_n^*\}$ to the bottleneck coordinator.

7. The apparatus as set forth in claim 3, wherein the bottleneck coordinator is configured to prune streams containing one or more buffered video sequences to avoid congestion.

8. A non-transitory computer readable medium comprising a plurality of instructions, the plurality of instructions configured to, when executed by a processor, cause the processor to:
transmit one or more video sequences;
perform bottleneck coordination by utilizing MPEG Media Transport (MMT) to transmit, via a transceiver, the one or more video sequences;
utilize asset delivery characteristics (ADC) scheme in the MMT to signal rate-distortion tradeoffs of video sessions sharing a common bottleneck;
construct a rate reduction-distortion incurred table; and
compute a pruning index for each of the video sessions.

9. The non-transitory computer readable medium as set forth in claim 8, wherein the one or more video sessions comprise one or more video streams including the one or more video sequences.

10. The non-transitory computer readable medium as set forth in claim 8, wherein the plurality of instructions are further configured to cause the processor to prune the one or more video sequences for at least one of: a determined capacity deficit; and a number of capacity deficits.

11. The non-transitory computer readable medium as set forth in claim 8, wherein the plurality of instructions are further configured to communicate with one or more ADC' s to perform traffic thinning.

12. The non-transitory computer readable medium as set forth in claim 11, wherein the plurality of instructions are further configured to perform optimization of traffic thinning schemes at the bottleneck coordinator.

13. The non-transitory computer readable medium as set forth in claim 11, wherein the plurality of instructions are further configured to compute optimal operating points $\{x_1^*, x_2^*, \ldots, x_n^*\}$, and communicate the optimal operating points $\{x_1^*, x_2^*, \ldots, x_n^*\}$ to the bottleneck coordinator.

14. The non-transitory computer readable medium as set forth in claim 8, wherein the plurality of instructions are further configured to prune streams containing one or more buffered video sequences to avoid congestion.

15. A method comprising:
transmitting one or more video sequences;
utilizing asset delivery characteristics (ADC) scheme in a MPEG Media Transport (MMT) to signal rate-distortion tradeoffs of video sessions sharing a common bottleneck;
constructing a rate reduction-distortion incurred table;
computing a pruning index for each of the video sessions; and
performing bottleneck coordination by utilizing the MMT to transmit, via a transceiver, the one or more video sequences.

16. The method as set forth in claim 15, wherein the one or more video sessions comprising one or more video streams including the one or more video sequences.

17. The method as set forth in claim 15, further comprising performing optimized traffic thinning at a bottleneck coordinator.

18. The method as set forth in claim 17, further comprising computing optimal operating points $\{x_1^*, x_2^*, \ldots, x_n^*\}$, and communicating the optimal operating points $\{x_1^*, x_2^*, \ldots, x_n^*\}$ to the bottleneck coordinator.

19. The method as set forth in claim 17, further comprising pruning, by the bottleneck coordinator, streams containing one or more video sequences that are buffered are pruned to avoid congestion.

20. The method as set forth in claim 19, further comprising pruning the one or more video sequences by the bottleneck for at least one of: a determined capacity deficit; and a number of capacity deficits.

* * * * *